United States Patent
Wang et al.

(10) Patent No.: US 8,756,607 B2
(45) Date of Patent: Jun. 17, 2014

(54) METHOD AND SYSTEM FOR CREATING AND UTILIZING VIRTUAL HARDWARE RESOURCES

(75) Inventors: Ming-jen Wang, Colorado Springs, CO (US); Stephen Johnson, Colorado Springs, CO (US); Owen Parry, Colorado Springs, CO (US); Bradley Dean Besmer, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 2187 days.

(21) Appl. No.: 11/504,190

(22) Filed: Aug. 14, 2006

(65) Prior Publication Data

US 2008/0040721 A1     Feb. 14, 2008

(51) Int. Cl.
*G06F 9/46* (2006.01)

(52) U.S. Cl.
USPC .......................................................... 718/104

(58) Field of Classification Search
USPC .......................................................... 718/104
See application file for complete search history.

(56) References Cited

U.S. PATENT DOCUMENTS

| | | | |
|---|---|---|---|
| 6,378,039 B1 * | 4/2002 | Obara et al. | 711/114 |
| 6,799,316 B1 * | 9/2004 | Aguilar et al. | 718/1 |
| 6,842,792 B2 | 1/2005 | Johnson et al. | 710/5 |
| 6,904,481 B1 | 6/2005 | Besmer et al. | 710/107 |
| 7,007,036 B2 | 2/2006 | McCarty et al. | 707/102 |
| 7,054,972 B2 | 5/2006 | Parry et al. | 710/260 |
| 7,124,410 B2 * | 10/2006 | Berg et al. | 718/104 |
| 7,313,680 B2 * | 12/2007 | Kyle et al. | 713/1 |
| 7,509,644 B2 * | 3/2009 | Worley, Jr. | 718/104 |
| 2006/0005188 A1 * | 1/2006 | Vega et al. | 718/1 |

OTHER PUBLICATIONS

LSI20320-R Ultra320 SCSI Single-Channel HBA, LSI Logic Corporation LSISAS3442X, LSISAS3080X, LSISAS3800X Serial Attach SCSI (SAS) Host BUS Adapters, LSI Logic Corporation LSISAS3442X-R 3GB/S SAS 8-Port HBA With Integrated Raid, LSI Logic Corporation LSISAS1064 4-Port PCI-X to 3Gb/s SAS Controller, LSI Logic Corporation LSISAS1064E 4-Port PCI Express to 3Gb/s SAS Controller, LSI Logic Corporation.

* cited by examiner

*Primary Examiner* — Gregory A Kessler
(74) *Attorney, Agent, or Firm* — Kevin Soules; Kermit D. Lopez; Luis M. Ortiz

(57) ABSTRACT

A data-processing method and system generally comprises identifying a plurality of hardware resources associated with a data-processing apparatus, time-slicing the plurality of hardware resources. Thereafter the plurality of active hardware resources can be allocated among a plurality of active hardware resources associated with the data-processing apparatus, thereby allowing a limited number of hardware resources to service a larger number of physical devices associated with the data-processing apparatus. An appropriate hardware resource can be selected from among the plurality of active hardware resources utilizing one or more swapping algorithms.

20 Claims, 4 Drawing Sheets

METHOD AND SYSTEM FOR CREATING AND UTILIZING VIRTUAL HARDWARE RESOURCES

TECHNICAL FIELD

Embodiments are generally related to data processing methods and systems. Embodiments are also related to the field of hardware resource utilization. Embodiments are additionally related to virtual hardware resources.

BACKGROUND OF THE INVENTION

Many processes and devices have been used for the utilization of virtual hardware resources. In a data processing system (e.g., a workstation or personal computer), an input/output (I/O) adapter such as a SCSI (small computer system interface) controller may be present as an interface device that is located between a peripheral device (e.g., a disk drive) and an I/O bus of the workstation or personal computer for connection with the peripheral device.

In hardware resource utilization devices such as a Gen 1 serial attached SCSI (SAS) host bus adapter (HBA), the number of supported drives is limited to the amount specified by a Hardware Device Index (HDI), which is analogous to a reference to an entry in a hardware table that records detailed information about a currently connected drive associated with a particular hardware. In a controller device such as SAS 1068 controller, there are only 256 hardware device indices. Several of these have been reserved for other purposes and hence communication can be accomplished to only 244 devices. Some product requirements involve supporting up to 1024 drives for particular applications, which requires hardware resource utilization devices such as HBA firmware to hardware so that support exists for more than 244 devices.

Some devices for dynamically enabling and disabling interrupt coalescing in a data processing system involve consistently monitoring an I/O load on an input/output processor (IOP) of an input output (I/O) adapter. The firmware on the I/O adapter may possess a global variable that stores counters for peripheral component interconnect (PCI) function registers. Each counter tracks the number of outstanding I/Os of a corresponding PCI function register. The counter is incremented whenever a new I/O is received and is decremented upon posting the completed message back to the operating system (OS). A timer interrupt can be generated periodically so that an interrupt service register (ISR) may be periodically performed. In the ISR, the maximum value stored of each counter seen since last timer interrupt is analyzed. When the maximum value stored is greater than a predetermined threshold value, the interrupt coalescing is enabled.

Accordingly, a need exists for shifting the bottleneck from hardware (hard limiting factor, not flexible) to firmware (more flexible, drive court could be upgraded by adding more external memory), adding external memory and customizing a swapping algorithm to suite users in their topology and application. What is needed is a better technique for the creation and utilization of virtual hardware resources.

Accordingly, a need exists for creating and utilizing virtual hardware resources by shifting the bottle neck from hardware (hard limiting factor, not flexible) to firmware (more flexible, drive court could be upgraded by adding more external memory). A need also exists for the capability of upgrading by adding external memory and customizing a swapping algorithm. By using such a methodology, it is believed that the number of supported devices is virtually limitless.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data processing method.

It is another aspect of the present invention to provide for an improved method of hardware resource utilization.

It is a further aspect of the present invention to provide for a methodology of creating and utilizing virtual hardware resources.

The aforementioned aspects and other objectives and advantages can now be achieved as described herein. A data-processing method is disclosed, which generally includes identifying a plurality of hardware resources associated with a data-processing apparatus, and time-slicing the plurality of hardware resources. Thereafter the plurality of active hardware resources can be allocated among a plurality of active hardware resources associated with the data-processing apparatus, thereby allowing a limited number of hardware resources to service a larger number of physical devices associated with the data-processing apparatus. An appropriate hardware resource can be selected from among the plurality of active hardware resources utilizing one or more swapping algorithms.

The disclosed methodology thus involves dynamically allocating and freeing hardware device indices so that only drives with active I/Os are assigned a Hardware Device Index for a short duration. Such a methodology creates the illusion of virtual hardware resources so that the host driver "sees" more drives connected to an HBA than are physically allowed by the hardware resources. In real world applications, I/Os tend to operate in sequential bursts. This means that the possibility of all the connected drives having input/output (I/Os) outstanding simultaneously is minimal.

In the event that all hardware device indices are currently being used, and there are more pending I/Os to drives that are not currently assigned, a swapping algorithm can be applied to maintain the fairness of I/O distribution. Firmware can select an appropriate device based on the swapping algorithm and all new I/Os attached to that device. Such firmware can also let the current outstanding I/Os for the device finish so that the hardware device Index is freed up and assigned to other drives. In this methodology, the number of supported devices is virtually limitless with the number still bounded by the total amount of memory accessible to firmware for storing each device. Such features shift the bottleneck from hardware (i.e., hard limiting factor, not flexible) to firmware, which is more flexible and permits the drive count to be upgraded by the addition of more external memory.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
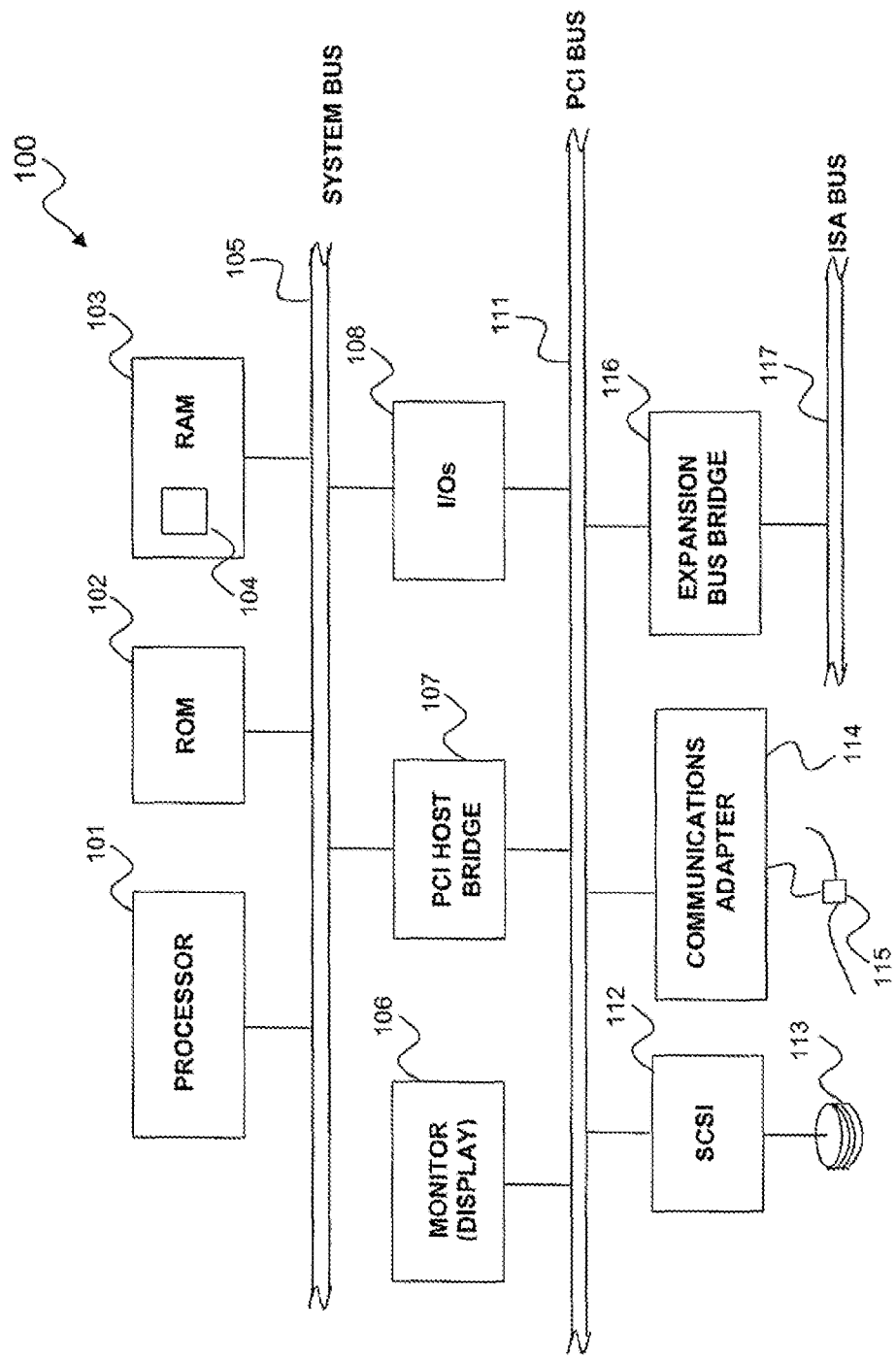
FIG. 1 illustrates a block diagram of a representative data-processing apparatus (e.g., computer), which can be adapted for use in implementing the methodology described herein.

The particular values and configurations discussed in these non-limiting examples can be varied and are cited merely to illustrate at least one embodiment and are not intended to limit the scope thereof.

The following definitions are utilized herein:

Firmware: Software (programs or data) that can be written onto read-only memory (ROM). Firmware is a combination of software and hardware and/or ROMs, PROMs and EPROMs that have data or programs recorded on them are firmware.

Pending I/O: An I/O that's on the device pending queue but has not been sent to a device yet.

Active I/O: An I/O that has already been sent to a device but was not completed yet.

New Dev: A device that has at least one I/O pending, but does not have the h/w resource to start the I/O(s).

Old Dev: A device that has the h/w resource and already started at least one I/O.

New Dev List: A list that keeps track of all the New Dev waiting to be started.

Old Dev List: A list that keeps track of all the Old Dev waiting to be replaced.

Swapping Algorithm: An algorithm that determines which Old Dev is to be swapped out.

Preempt Bit: A bit in the device structure that forces the new I/Os on that device to be pended but not started.

Note that the embodiments disclosed herein can be implemented in the context of a host operating system and one or more software modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the present invention is described in the context of a fully functional data-processing apparatus (e.g., a computer system), those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

The embodiments disclosed herein may be executed in a variety of systems, including a variety of computers running under a number of different operating systems. The computer may be, for example, a personal computer, a network computer, a mid-range computer or a mainframe computer. In the preferred embodiment, the computer is utilized as a control point of network processor services architecture within a local-area network (LAN) or a wide-area network (WAN).

Referring now to the drawings and in particular to FIG. 1, there is depicted a block diagram of a representative data-processing apparatus 100 (e.g., computer), which can be adapted for use in creating and utilizing virtual hardware resources in accordance with a preferred embodiment. As depicted in FIG. 1, a processor (CPU) 101, a Read-Only memory (ROM) 102, and a Random-Access Memory (RAM) 103 are connected to a system bus 105 of data-processing apparatus 100. CPU 101, ROM 102, and RAM 103 are also coupled to Peripheral Component Interconnect (PCI) local bus 111 through a PCI host-bridge 107. The PCI Host Bridge 107 provides a low latency path through which the processor 101 may directly access PCI devices mapped anywhere within bus memory and/or input/output (I/O) address spaces. PCI Host Bridge 107 also provides a high bandwidth path for allowing PCI devices to directly access RAM 103.

Also attached to PCI local bus 111 are communications adapter 114, small computer system interface (SCSI) 112, and expansion bus-bridge 116, communications adapter 114 is utilized for connecting data-processing apparatus 100 to a network 215. SCSI 212 is utilized to control high-speed SCSI disk drive 113. Expansion bus-bridge 116, such as a PCI-to-ISA (instruction service architecture) bus bridge, may be utilized for coupling ISA bus 117 to PCI local bus 111. In addition, I/Os 108 are attached to PCI local bus 111. Note that PCI local bus 111 can further be connected to a monitory 106, which functions as a display (e.g., a video monitor) for displaying data and information for a user and for interactively displaying a graphical user interface (GUI). In alternate embodiments, additional peripheral components may be added or existing components can be connected to the system bus. For example, the monitor 106 can instead be connected to system bus 105, depending upon design configurations.

Data-processing apparatus 100 also preferably includes an interface such as a graphical user interface (GUI) and an operating system (OS) that reside within machine readable media to direct the operation of data-processing apparatus 100. In the preferred embodiment, OS (and GUI) contains additional functional components, which permit network-processing components to be independent of the OS and/or platform. Any suitable machine-readable media may retain the GUI and OS, such as RAM 103, ROM 103, SCSI disk drive 113, and other disk and/or tape drive (e.g., magnetic diskette, magnetic tape, CD-ROM, optical disk, or other suitable storage media). Any suitable GUI and OS may direct (CPU) central processing unit 101.

Further, data-processing apparatus 100 preferably includes at least one network processor services architecture software utility 104 (i.e., program product) that resides within machine-readable media, for example a custom defined service utility within RAM 103. The software utility 104 (e.g., software module/program product) contains instructions (or code) that when executed on CPU 101 interacts with the OS. Software module or utility 104 can be, for example, a program product as described herein. The utility or module 104 can thus be executed by data-processing apparatus 100 and are operable in combination with one another to perform the logical operational steps disclosed below with respect to FIGS. 2-4.

Figure 2:
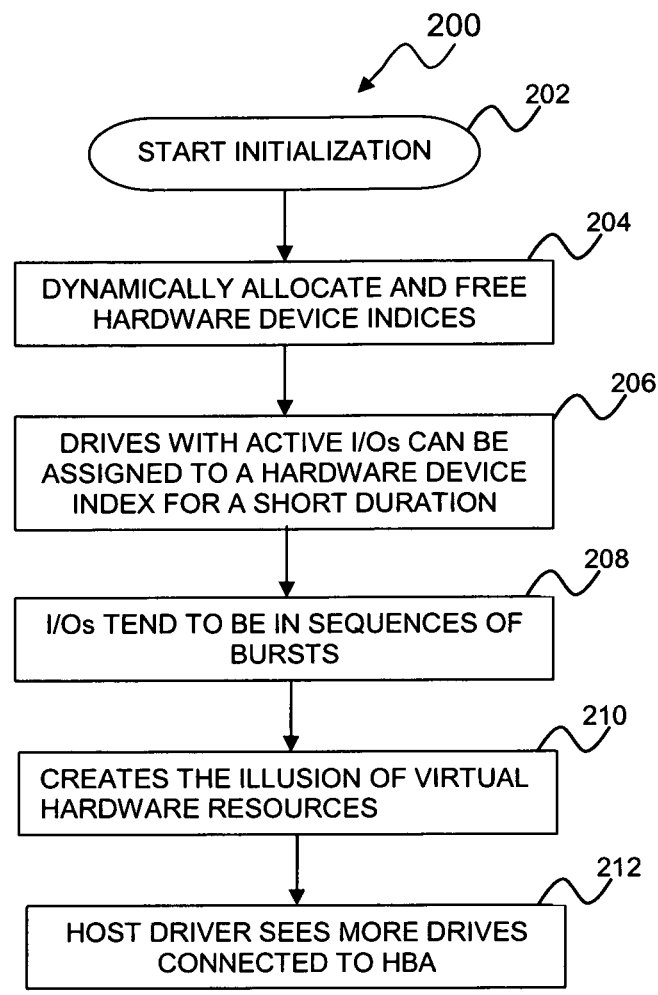
FIG. 2 illustrates a high-level flow chart of operations for creating and utilizing virtual hardware resources in accordance with a preferred embodiment.

FIG. 2 illustrates a high-level flow chart 200 of operations illustrating a method for creating and utilizing virtual hardware resources which can be implemented in accordance with a preferred embodiment. As depicted at block 202 an initialization can occur. Next, as indicated at block 204, hardware indices are dynamically allocated and freed. Thereafter as described at block 206, the drives with active I/Os can be assigned a hardware device index for a short duration. Next, as indicated at block 208, I/Os tend to be configured in sequential bursts, thereby creating an illusion of virtual hardware resources as described thereafter at block 210. Finally, as indicated at block 212, the host driver "sees" more drives connected to the HBA.

Figure 3:
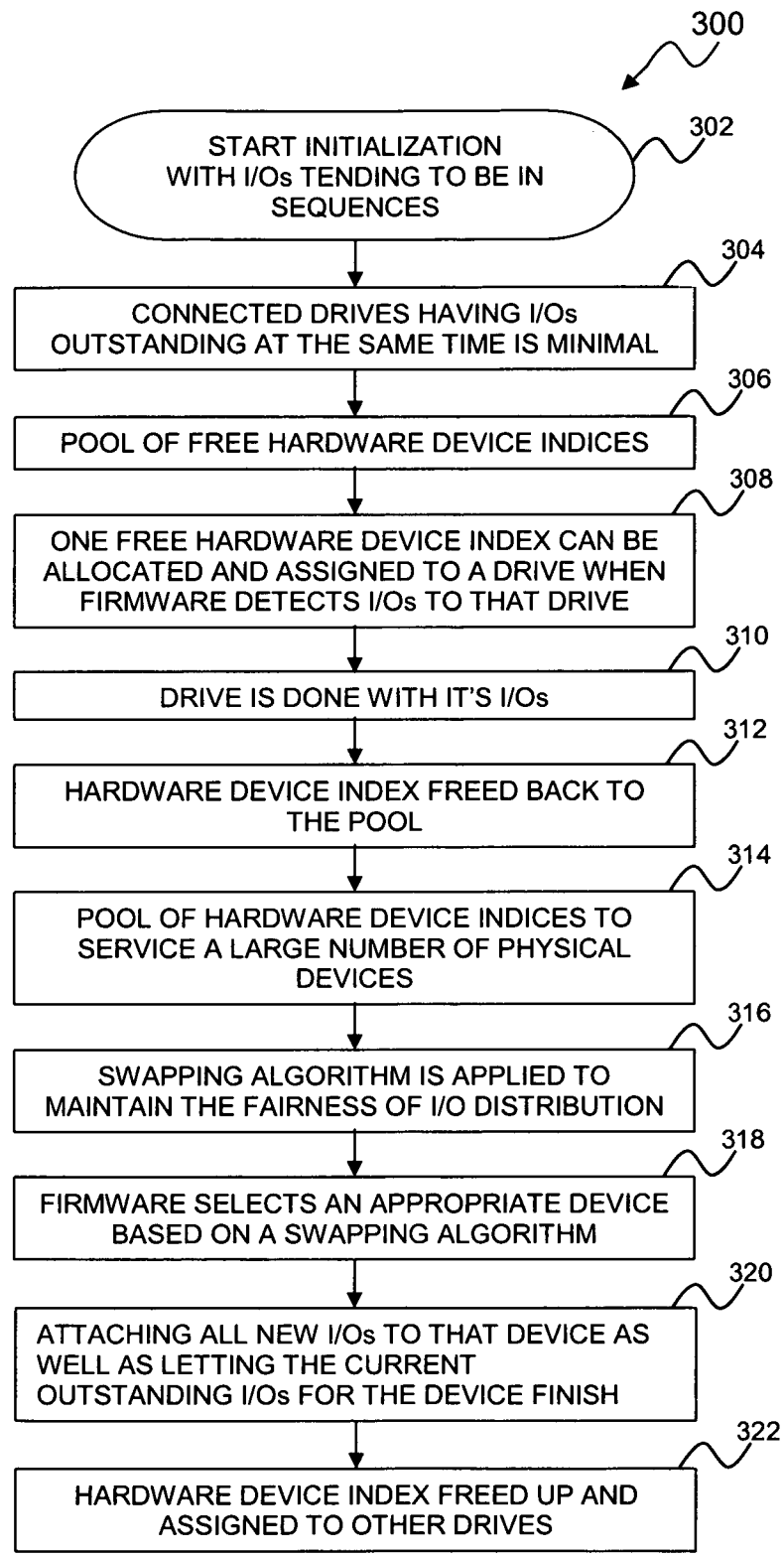
FIG. 3 illustrates a high-level flow chart of operations depicting a method for creating and utilizing virtual hardware resources which can be implemented in accordance with an alternative embodiment.

FIG. 3 illustrates a high-level flow chart 300 operations for creating and utilizing virtual hardware resources in accordance with a preferred embodiment. As depicted at block 302, an initialization can occur wherein I/Os tend to be arranged in a sequential fashion. Next, as indicated at block 304, the hardware device(s) can be allocated to hardware device indices and simultaneously if a hardware device(s) is allocated to I/O(s) the hardware device indices should also be freed. Thereafter, as depicted at block 306 a pool of free hardware device indices is designated and one free hardware device index among the pool of free hardware devices can be allocated and assigned to a drive when the firmware detects I/Os to that drive as described at block 308.

Next, as indicated at block 310 when the drive is finished with it's I/Os, the hardware device index can be freed to the pool as indicated at block 312. Thereafter, as described at block 314, the pool of hardware device indices can be used to service a large number of physical devices. The swapping algorithm can then be applied to maintain the fairness of I/O distribution as described at block 316. Thereafter, as indicated at block 318, the firmware can select an appropriate device based on the swapping algorithm. The firmware can attach all new I/Os to that device as well as let the current outstanding I/Os for the device finish. Finally, as depicted at block 322, the hardware device index can be freed and assigned to other drives.

Figure 4:
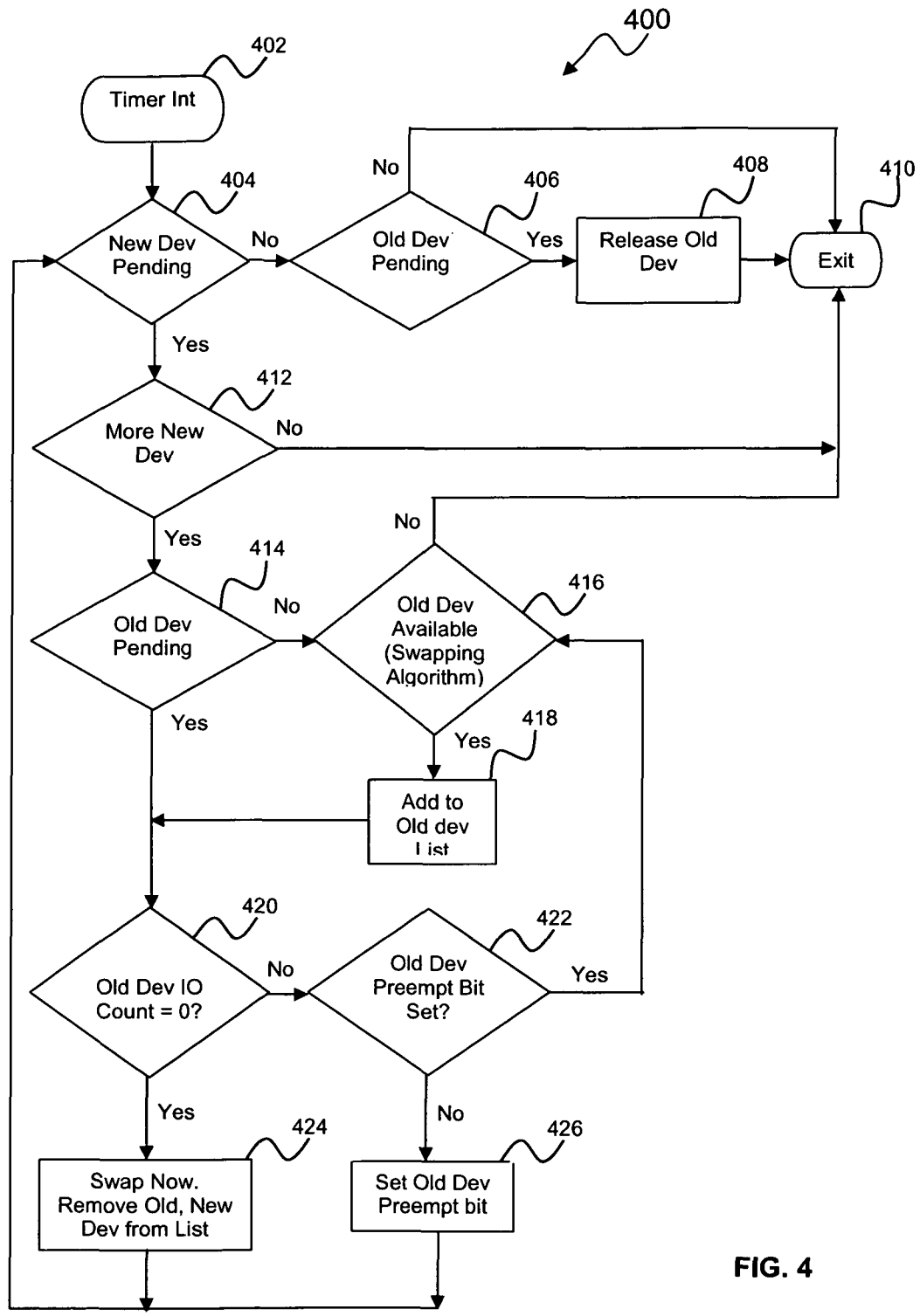
FIG. 4 illustrates a high-level flow chart of operations for creating and utilizing virtual hardware resources in accordance with an alternative preferred embodiment.

FIG. 4 illustrates a high-level flow chart 400 of operations depicting a method for creating and utilizing virtual hardware resources in accordance with a preferred embodiment. As depicted at block 402, for checking the devices that has at least one I/O pending, but does not have the h/w resource to start the I/O(s) a device checking process has to be invoked periodically at every timer interrupt (e.g., 125 ms). Next, as indicated at block 404, a test is performed to determine if any "New Devs" are waiting to start. If no New Dev is pending, an operation can be performed to acquire an old "Dev" as indicated at block 406.

If "Old Dev Pending" is not available then the process exits as indicated at block 410. Otherwise the "Old Dev" is released as described at block 408 and then exits as indicated at block 410. Thereafter, as described at block 412, if there are more New Devs, an operation is performed to determine if such devices have already allocated an Old Dev to be swapped out as indicated at block 414. If it is not allocated, then a swapping algorithm is processed to determine if any Old Devs are available as indicated at block 416. If at least one Old Dev is available, then this value is added to the Old Dev List as described at block 418. If not, the process exit and waits for the next invocation as indicated at block 410.

After an "Old Dev" is added to the old Dev list, an I/O count process is implemented, as described at block 420, to determine if the I/O count on the Old Dev is equivalent to a zero value. If it is zero, an operation occurs in which the h/w resource is swapped from the pending Old Dev to the pending New Dev so that the New Dev can start its I/O operations. Once the swapping operation is complete, an operation can be performed as described at block 424 to remove the Old Dev and New Dev from their respective lists. If the I/O count associated with an "Old Dev" is not zero, then this value has to be forced to zero by setting a "Preempt bit" as indicated at block 422. Once the preempt bit is set, the Old Dev parameter has 125 ms (i.e., an interrupt interval) to finish its active outstanding I/O operations, as described at block 426. If the Old Dev's I/O count did not go back to zero at the next interrupt operation, another Old Dev is allocated as indicated at block 416. The process repeats and determines if there is another New Dev on the New Dev list. When the process gets to the end of the list, it exits the operations described with respect to FIG. 5.

Varying swapping algorithms can be implemented in accordance with preferred or alternative embodiments. Swapping algorithms generally used creating and utilizing virtual hardware resources can include the so-called "round robin" algorithm, least recently used (LRU) techniques and least I/O count (LIC) processes. The round robin algorithm always picks the next entry on the list, regardless of how busy the device might be. When the operation gets to the end of the list, it wraps around and starts again from the beginning of the list. In an LRU algorithm the utilization rate of each device is monitored and the least recently used value is selected to be swapped out. This approach can generally minimize the performance impact of the whole system. Finally, the LIC algorithm keeps track of the I/O rate of each device and selects the device with the least I/O to be swapped out. This generally minimizes the performance impact to the entire system.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A data-processing method comprising:
arranging a plurality of I/O devices in a sequential order;
identifying a plurality of hardware resources associated with a data-processing apparatus;
time-slicing said plurality of hardware resources by executing a program instruction utilizing a computer;
allocating said plurality of active hardware resources among a plurality of active hardware device indices associated with said data-processing apparatus; and
freeing said hardware device indices when said associated active hardware resource is allocated to one of a plurality of drives associated with or in communication with said data-processing apparatus, thereby allowing a limited number of hardware resources to service a larger number of physical devices associated with said data-processing apparatus by executing a program instruction utilizing a computer.

2. The method of claim 1 further comprising selecting an appropriate hardware resource from among said plurality of active hardware resources utilizing at least one swapping algorithm by executing a program instruction utilizing a computer.

3. The method of claim 1 further comprising a pool of free hardware device indices that are available to other data-processing components.

4. The method of claim 3 wherein that at least one free hardware resource among a pool of free hardware resources is allocated and assigned to one of said drives associated with or in communication with said data-processing apparatus.

5. The method of claim 4 wherein a firmware detects at least one input to said drive.

6. The method of claim 1 wherein at least one hardware resource among said plurality of hardware resources comprises a host bus adapter component.

7. The method of claim 6 wherein said host bus adapter component comprises a serial attached SCSI host bus adapter (HBA).

8. A data-processing system comprising:
a data-processing apparatus;
a module executed by said data-processing apparatus, said module and said data-processing apparatus being operable in combination with one another to:
arrange a plurality of I/O devices in a sequential order;
identify a plurality of hardware resources associated with a data-processing apparatus;
time-slice said plurality of hardware resources;
allocate said plurality of active hardware resources among a plurality of active hardware device indices associated with said data-processing apparatus; and
freeing said hardware device indices when said associated active hardware resource is allocated to one of a plurality of drives associated with or in communication with said data-processing apparatus, thereby allowing a limited number of hardware resources to service a larger number of physical devices associated with said data-processing apparatus.

9. The system of claim 8 wherein said data-processing apparatus and said module are further operable in combination with one another to select an appropriate hardware resource from among said plurality of active hardware resources utilizing at least one swapping algorithm.

10. The system of claim 8 further comprising a pool of free hardware device indices that are available to other data-processing components.

11. The system of claim 10 wherein that at least one free hardware resource among a pool of free hardware resources is allocated and assigned one of said drives associated with or in communication with said data-processing apparatus.

12. The system of claim 11 wherein a firmware detects at least one input to said drive.

13. The system of claim 8 wherein at least one hardware resource among said plurality of hardware resources comprises a host bus adapter component.

14. The system of claim 13 wherein said host bus adapter component comprises a serial attached SCSI host bus adapter (HBA).

15. One or more processor readable storage devices having a processor readable code embodied on said processor readable storage devices, said processor readable code for programming one or more processors to perform a method comprising:
arranging a plurality of I/O devices in a sequential order;
identifying a plurality of hardware resources associated with a data-processing apparatus;
time-slicing said plurality of hardware resources;
allocating said plurality of active hardware resources among a plurality of active hardware device indices associated with said data-processing apparatus; and
freeing said hardware device indices when said associated active hardware resource is allocated to one of a plurality of drives associated with or in communication with said data-processing apparatus, thereby allowing a limited number of hardware resources to service a larger number of physical devices associated with said data-processing apparatus.

16. The processor readable code of claim 15 further comprising selecting an appropriate hardware resource from among said plurality of active hardware resources utilizing at least one swapping algorithm.

17. The processor readable code of claim 15 further comprising a pool of free hardware device indices that are available to other data-processing components.

18. The processor readable code of claim 17 wherein that at least one free hardware resource among a pool of free hardware resources is allocated and assigned to one of said drives associated with or in communication with said data-processing apparatus.

19. The processor readable code of claim 18 wherein a firmware detects at least one input to said drive.

20. The processor readable code of claim 15 wherein at least one hardware resource among said plurality of hardware resources comprises a host bus adapter component.

* * * * *